United States Patent [19]
Eberhardt

[11] Patent Number: 5,130,187
[45] Date of Patent: Jul. 14, 1992

[54] FLOORMAT ARRANGEMENT

[76] Inventor: Peter Eberhardt, 28 Sarena, Irvine, Calif. 92715

[21] Appl. No.: 280,862

[22] Filed: Dec. 7, 1988

[51] Int. Cl.⁵ .................... B32B 33/00; D04H 11/00
[52] U.S. Cl. ........................... 428/95; 428/88; 428/96; 4/583; 15/215; 15/217
[58] Field of Search .............. 428/88, 95, 96, 97; 4/581, 582, 583; 15/215; 180/90.6

[56] References Cited

U.S. PATENT DOCUMENTS

| | | | |
|---|---|---|---|
| 2,709,105 | 5/1955 | Kramer | 4/583 X |
| 4,016,318 | 4/1977 | Di Gioia et al. | 428/95 |
| 4,382,986 | 5/1983 | Reuben | 428/95 X |
| 4,421,809 | 12/1983 | Bish et al. | 428/95 X |
| 4,588,628 | 5/1986 | Roth | 428/95 X |
| 4,721,641 | 1/1988 | Bailey | 428/88 |
| 4,762,741 | 8/1988 | Hedley | 428/95 X |

Primary Examiner—George F. Lesmes
Assistant Examiner—D. R. Zirker
Attorney, Agent, or Firm—Ladas & Parry

[57] ABSTRACT

A floormat comprised of multiple layers the upper or outer layer of which is a carpet layer, an intermediate layer is a carpet backing layer and the lower layer is a non-slip material bonded to the intermediate layer. The non-slip material provides a high coefficient of friction to resist movement of the multilayer mat on the surface upon which it is positioned. Retention straps may be secured to the multilayer mat and the retention straps attached to some desired structure such as in an automobile as a further aid in preventing movement of the multilayer mat.

14 Claims, 3 Drawing Sheets

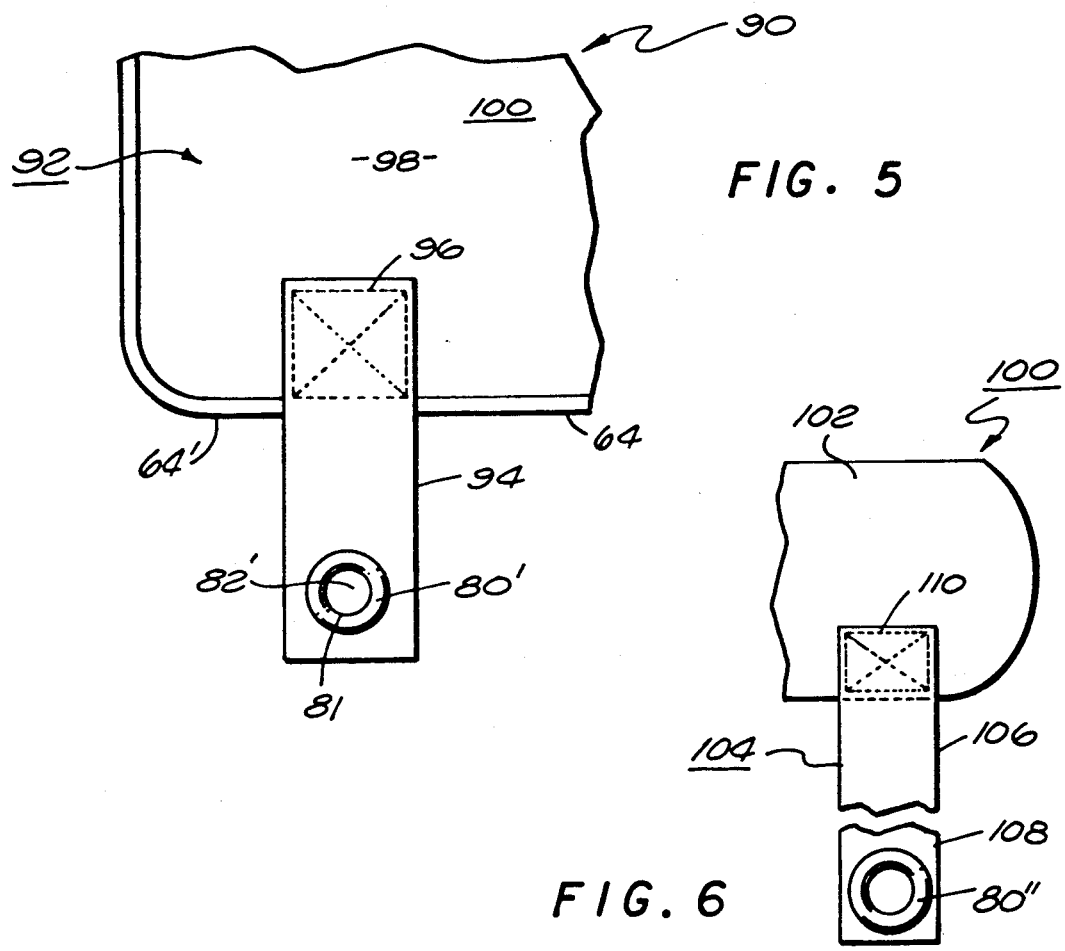
FIG. 5
FIG. 6
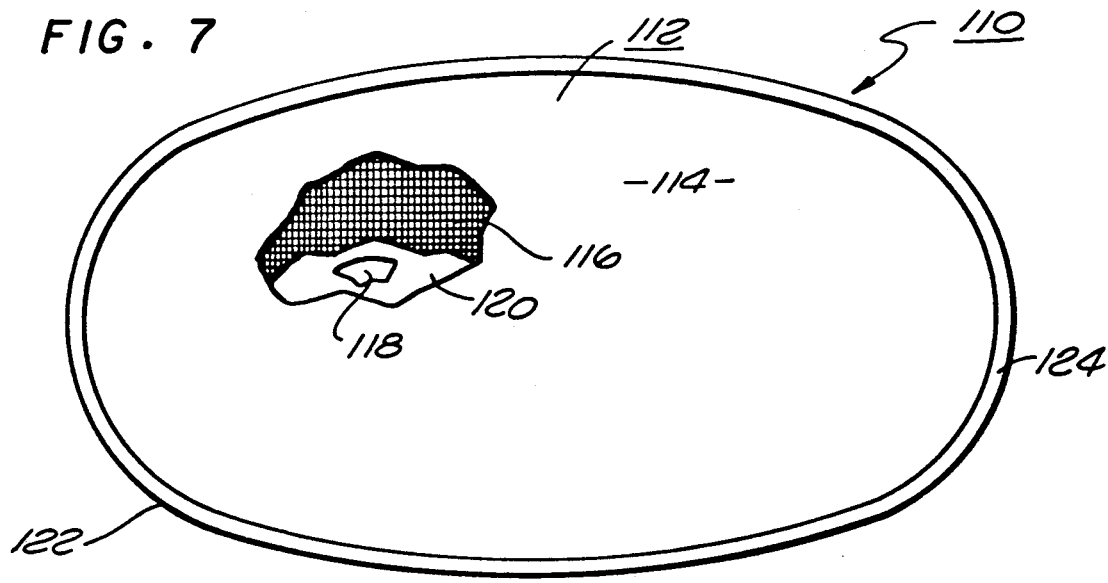
FIG. 7

FLOORMAT ARRANGEMENT

BACKGROUND OF THE INVENTION

1. Field of the Invention

This invention relates to the carpet art and more particularly to an improved floormat arrangement for providing high degree of resistence to relative motion between the floormat and the surface upon which it is placed.

2. Description of the Prior Art

Floormats of various kinds and for utilization in various environments have heretofore been known. More particularly, floormats that attempt to provide a "non-skid" effect that is, eliminating or minimizing relative movement of the floormat with respect to the surface upon which it is placed have heretofore been utilized in applications such as bathmats, runners, and the like. Additionally, non-skid floormats are desireable for positioning in vehicles such as automobiles. Such floormats are generally placed upon the carpeting provided in such vehicles and thus serve to preserve the basic carpeting of the vehicle and absorb the use attendent to such an environment.

In such vehicle floormats not only is it desired but often is a matter of safety that relative movement between the floormats and the carpeting (or other surface) upon which it is placed be eliminated or minimized to a very low degree. Safety considerations, particularly with respect to floormats utilized in the driver's position of the vehicle require that the floormat not move relative to the carpet or other surface upon which it is placed such that it will interfere with the various operational controls of the vehicle such as, for example, accelerator pedal, brake, or the like.

Thus, in addition to having the requirement for providing an esthetically pleasing appearance, floormats, regardless their environment of intended use, must also provide a comparatively long life, are preferably fire resistant and, preferably, may be readily cleaned. Further, in many applications including vehicles as well as kitchens, bathrooms and the like, it is desired that the backing material that is in contact with the surface upon which the floormat is placed be water resistant and as close to waterproof as possible as well as "non-marring" to the surface upon which it is placed. For vehicle applications it is also desired that the entire floormat be as light a weight as possible and as inexpensive as possible in order to reduce both the overall weight and the cost of the vehicle. Accordingly, there has long been a need in many applications for a "non-skid" floormat that provides a high degree of resistance to relative movement with respect to the surface upon which it is placed, and in which the backing for the floormat is comparatively waterproof and non-marring, and in which the entire floormat can provide a esthetically pleasing appearance combined with a comparatively light weight.

SUMMARY OF THE INVENTION

It is an object of the present invention to provide an improved non-slip floormat.

It is another object of the present invention to provide an improved non-slip floormat particularly adapted for use in vehicles and of the type resting upon the carpeting or other surface, provided in such vehicles.

It is another object of the present invention to provide an improved non-slip floormat that is comparatively light weight non-marring, and in which the non-slip backing is comparatively waterproof.

It is another object of the present invention to provide a non-slip floormat that has a high degree of resistance to relative movement with respect to the surface upon which it is placed.

The above and other objects of the present invention are achieved, according to the preferred embodiment thereof, by providing a multilayer floormat having three layers. The first or upper layer comprises a carpet layer, the intermediate layer is a carpet backing layer that is coextensive with the carpet layer and is bonded thereto substantially throughout the extent thereof. The combination of the carpet and backing affixed thereto comprises a structure that is readily available from many manufacturers in many different carpet design configurations and a variety of backing materials. The particular carpet configuration and/or design and the particular backing material may be selected as desired for any particular application of the present invention.

The lower layer of the multilayer mat comprises a non-slip layer and extends substantially coextensive with the second or backing layer and is bonded to the backing layer substantially coextensively therewith. The peripheral edges of each of the carpet layer, backing layer and non-slip layer are in alignment and a carpet binding is affixed for example by sewing around the peripheral edges. The peripheral edges of the multilayer mat may define any desired geometrical configuration.

The non-slip layer is ethylene propylene terpolymer-polyethelene-butyl a material fabricated by Rubatex, Inc., P. 0.Box 340, Bedford, Va. 24523. It has been found that such a material when fabricated to have certain characteristics such as a density of approximately 5 lbs. per cubic foot and a shore durometer hardness on the 00 scale in the range of 20-45 provides a high degree of non-slip characteristic for the floormat.

Additionally, if desired a strap means may be secured to the multilayer floormat and have an appropriate grommet through which a bolt may be placed for securing the floormat to, for example, the basic vehicle structure in which such a floormat may be placed. For convenience in removal for cleaning and other purposes and/or replacement, the strap means may be comprised of two straps, one sewn or otherwise affixed to the floormat and the other mounted on the vehicle by the above mentioned bolt. The two straps may be coupled together by a conventional snap fastener. Such an arrangement allows a quick and easy removal and/or replacement of the floormat.

When such a non-slip lower layer for the floormat was made of the above mentioned ethylene propylene terpolymer-polyethlene-butyl such a mat was found to have satisfactory non-slip characteristics when placed upon a carpeting in a vehicle such that it did not move relative to the carpeting. Thus, such a carpet did not interfere with the normal function of the operational control such as brake, gas pedal or the like.

BRIEF DESCRIPTION OF THE DRAWING

The above and other embodiments of the present invention are shown in the accompanying drawing wherein similar reference characters refer to similar elements throughout and in which:

FIG. 5 illustrates another embodiment of the present invention;

FIG. 6 illustrates another embodiment of the present invention; and

FIG. 7 illustrates another embodiment of the present invention.

DESCRIPTION OF THE PREFERRED EMBODIMENTS

Figure 1:
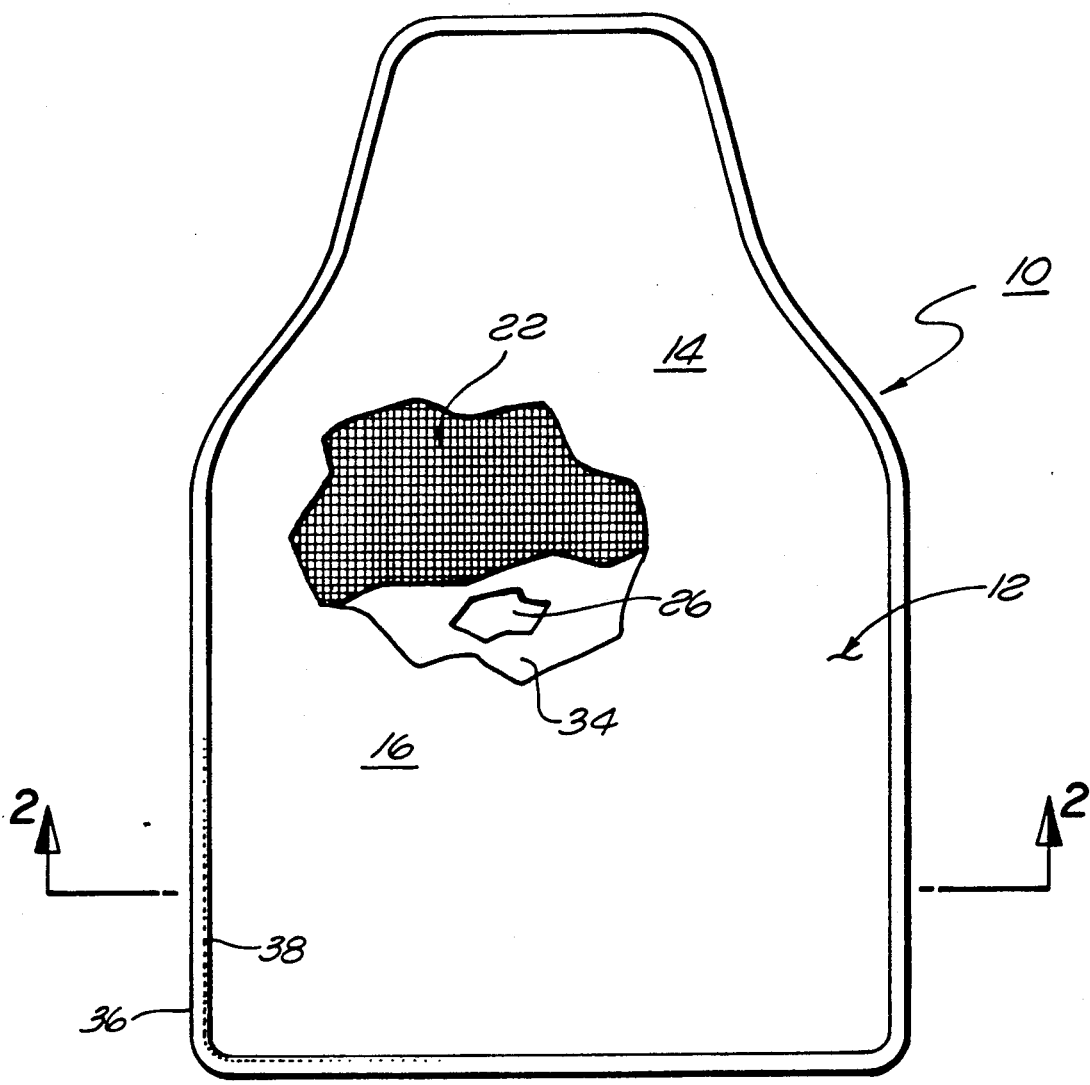
FIG. 1 illustrates a preferred embodiment of the present invention.
Figure 2:
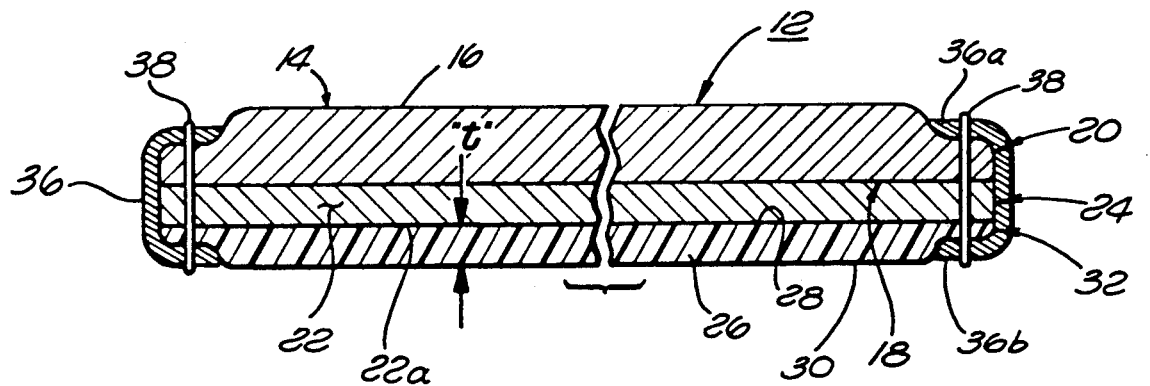
FIG. 2 is a sectional view along the line 2—2 of FIG. 1.

Referring now to the drawing there is illustrated in FIGS. 1 and 2 a preferred embodiment, generally designated 10 of a multilayer floormat generally designated 12 according to the principles of the present invention. As shown in FIGS. 1 and 2 the multilayer mat 12 is configured for a vehicle, such as an automobile floormat, and is adaptable to be placed upon the carpeting or other supporting surface in such an automobile. The multilayer floormat 12 has a high degree of resistance to movement relative to the carpeting upon which it is placed in the vehicle.

The multilayer mat 12 is generally comprised of three layers. The first or upper layer 14 is a carpet layer and has an outer surface generally designated 16, an inner surface generally designated 18, and peripheral edge generally designated 20 defining a predetermined geometrical shape. For example, the shape may be, as noted above, that associated with floormats placed in automobiles and adapted to rest upon the carpeting that is provided in such automobiles. The first or upper layer 14 may be any desired conventional carpeting and, for example, may be sixteen, eighteen, twenty or twenty-four continuous filament BCF nylon carpeting. Such carpeting has been found to have a high degree of wear resistance coupled with an attractive external appearance in the outer surface 16 thereof.

A second, intermediate layer, generally designated 22 is a carpet backing layer and is bonded to the inner surface 16 of the first upper layer 14 and is substantially coextensive therewith and has a peripheral edge 24 aligned with the peripheral edge 20 of the first upper layer 16. The carpet backing layer 22 may, for example, be a latex laminated, 100% polypropolene, woven material sold in the carpeting trade under the trademark "ActionBac", available from Amoco Fabrics Company, Patchogue Plymouth Division, Atlanta, Ga. It will be appreciated that, of course, the particular carpeting layer and the particular carpet backing layer may be selected as desired as long as they are compatible with the other elements of the multilayer floormat as described below, and provide the desired characteristics. As above described, the continuous filament BCF nylon carpet together with the latex laminated polypropolene backing is readily available from a variety of manufacturers in a variety of colors and designs of the carpeting. Such a combination as above described has been found useful in the practice of the present invention.

A third non-slip, lower layer 26 is provided and the third lower layer 26 has an inner surface 28 and a lower surface 30 and a predetermined thickness as indicated by the letter "t" in FIG. 2. The third layer 26 is a non-slip layer and extends substantially coextensively with the second or intermediate layer and has a peripheral edge 32 substantially aligned with the peripheral edges 20 and 24 of the first and second layers, respectively.

In preferred embodiments in the present invention it has been found that the third layer or non-slip layer 26 is preferably fabricated from ethylene propylene terpolymer-polyethelene-butyl as sold by Rubatex, Inc., P. 0. Box 340, Bedford, Va. 24523. Such material fabricated with a density in the range of 5 lbs. per cubic foot and with a shore durometer hardness on the 00 scale in the range of 20-45 provides a satisfactory non-slip characteristic in accordance with the principles of the present invention. Such material is essentially waterproof that is, after a 24 hour test of water being present on the outersurface 16 of the first or carpet layer 14 and after a standard cylinder test in which a quarter inch of water was present on the outer surface 16 of a sample of the multilayer carpet 12 for twenty-four hours, there was no water penetration through the specimen and the lower surface 30 of the non-slip layer 26 remained dry.

The innerface 28 of the lower layer 26 is bonded to the second or carpet backing layer 22 substantially throughout the extent thereof. When the non-slip material utilized for the third layer 26 is the above mentioned ethylene propylene terpolymer-polyethelene-butyl and the second or carpet backing layer 22 is the latex laminated, 100% polypropolene which is in a woven form as schematically indicated for the layer 22 in FIG. 1, it has been found that a bonding agent such as that sold under the tradename "Weld-On 3352" available from Industrial Polyetenical Service, Gardena, Calif. 90248, provides a satisfactory bonding. The Weld-On 3352 is a petroleum hydrocarbon fraction liquid having a light tan, syrupy appearance, a naptha like odor, a boiling point in the range of 145 F. to 190 F., a vapor pressure on the order of 155MM mercury at 68 F., a specific gravity at 7312 F. at 0.752, and a vapor density of 3 compared with dir = 1. The bonding agent is not soluble in water, has an evaporation rate of approximately 8 based on BUAC = 1 and is approximately 70% volatile by volume. This bonding agent does not require any elevated temperature or extended curing time nor does it require any pressure to provide the satisfactory bonding. It has been found that by spreading this bonding agent on the inner surface 22a of backing layer 22 and applying the non-slip layer 26 thereto, bonding between the backing layer 22 and non-slip layer 26 by the bonding material (which is indicated FIG. 1 generally at 34) provides satisfactory bonding in a comparatively short time without elevated temperatures, pressures or long curing times. Thus, the assembly time for assembling a multilayer floormat by affixing the non-slip layer 26 to the backing layer 22 is a comparatively rapid process.

The peripheral edges 20, 24 and 32 of the first layer 14, second layer 22 and third layer 26, respectively, are covered with an edge binding means generally designated 36 extending around the periphery of the multilayer floormat 12. The edge binding 36 may be secured to the first layer 14, second layer 22 and third layer 26 by stitching as indicated at 38 which stitching extends through all three layers 14, 22 and 26 of the multi-layer floormat 12.

When the first layer 14 is comprised of a 16 ounce-24ounce continuous filament BCF nylon carpet and the second layer as the above mentioned latex laminated 100% polypropolene "ActionBac" and the third layer 26 is the ethylene propylene terpolymer-polyethelene-butyl material as above described the multilayer floormat 12 meets the motor vehicle safety standard No. 302 as specified in 49 CFR 571.302.

It has been found that the thickness "t" of the third non-slip layer 26 may be in the range of ⅛th inch to ¼th inch and in the preferred embodiments the thickness "t" may be on the order of ⅛th of an inch.

The edge binding 36 has a first portion 36a extending over the outer surface 16 of the first layer 14 in regions adjacent the peripheral edge 20 thereof and a second portion 36b extending over the lower surface 30 of the third layer 26 in regions adjacent the peripheral edge 32 thereof. The stitches 38, which may be thread, secure the edge binding means 36 to the first layer 14, second layer 22, and third layer 26.

In the embodiments of the, present invention when the third layer 26 is fabricated from ethylene propylene terpolymer-polyethelene-butyl it has been found that such a layer fabricated to have a density on the order of 5 lbs. per cubic foot and a shore durometer hardness on the 00 scale in the range of 20-45, a high coefficient of friction and thus a high resistance to slip is provided for the multilayer floormat 12. For example, when such a multilayer floormat 12 fabricated as described above was subjected to a slip resistance test the static coefficient of friction on the carpeting of the type utilized in many vehicles was on the order of 2.2, with a dynamic coefficient of friction on the order of 2.7. The static coefficient of friction for such a multilayer format 12 fabricated as described above on the vinyl heel pad of a typical vehicle carpeting was on the order of 1.9. Both the static and dynamic coefficient of friction for such a multilayer floormat 12 as above described was found to be higher than the corresponding static and dynamic coefficient of friction for other multilayer floormats currently available. While the damaged coefficient of friction of a "spiked" backing on a floormat was higher, the spiking tore the carpeting upon which it rested.

The characteristics of the third layer 26 are set forth in Table 1 below. With respect to the material set forth in Table 1, the water absorption was so low due to the lightweight of the ethylene propylene terpolymer-polyethelene-butyl, an alternate method for the testing of the water absorption from the standard water absorption test was utilized. However, tests have shown that a composite multilayer floormat as well, of the type described above, had no moisture passing through the third layer 26 despite a 24-hour subjection of the upper layer 14 to a ¼ inch column of water.

TABLE 1

| ETHYLENE PROPYLENETERPOLYMER POLYETHELENE-BUTYL | |
|---|---|
| SPECIFICATIONS | |
| ASTM D-1056-67 | RE-41 |
| ASTM D-1056-68 | RE-41 |
| ASTM D-1056-78 | RE-41 |
| MIL-C-3133C,MIL-STD-670B | RE-3-F2 |
| COMPRESSION DEFLECTION (p.s.i.) | 2-5 |
| SHORE 00 DUROMETER (Approx. Average) | 20-45 |
| DENSITY (p.c.f.) Average | 5.0 Max. |
| WATER ABSORPTION (Max.) | 0.1 lbs/ sq. ft. of cut surface |
| TEMPERATURE RANGE (°F.) | |
| Low (Flex without cracking) | −70° |
| High Continuous | 150° |
| High Intermittent | 200° |
| HEAT AGING | 5% |

TABLE 1-continued

| ETHYLENE PROPYLENETERPOLYMER POLYETHELENE-BUTYL | |
|---|---|
| (7 Days @ 158° F.) Lineal Shrinkage (Max.) | |
| TENSILE STRENGTH (p.s.i. Min.) | 30 |
| ELONGATION (% Min. | 150 |
| FUNGUS RESISTANCE MIL-STD-810C, Method 508.1 | Pass |
| FLAMMABILITY - FMVSS #302 burn rate in inches per minute | 4 |
| THICKNESS minimum thickness for lamination to floormat materials complying with FMVSS #302 | ⅛" |
| K FACTOR (@ 75° mean temperature) Btu. in./hr. sq ft °F. | 0.28 |
| RESILIENCE Bashore (% Rebound Average) (½" thickness @ 72° F.) | 44-55 |

(FMVSS = FORD MOTOR VEHICLE SAFETY STANDARD)

Since in some applications, such as vehicles, the weight of the floormat can become important, for example because of the fuel consumption limitations placed upon motor vehicles in the United States, it has been found that a multilayer floormat as described above wherein the third layer 26 was on the order of ⅛th of an inch thick, with a 16 ounce continuous filament BCF nylon carpet as the first layer 14, the weight of a driver side floormat was on the order of 23 ounces, a passenger side floormat was on the order of 21.8 ounces and the rear floormats were on the order of 13.5 ounces for a vehicle on the order of the size of a Ford Taurus or Ford Sable automobile. The weight of the floormats for the same vehicles with the first layer 14 made of 18 ounce continuous filament BCF nylon carpet was found to be approximately 24 ounces for the driver's side floormat, 22 ounces for passenger side floormat, and 14 ounces each for the rear floormats. The weight of the floormats having a 24 ounce continuous filament BCF nylon carpet utilized as the upper layer 14 and fabricated for a Lincoln automobile was found to be on the order of 27 ounces for the driver's side, 25 ounces for the front passenger floormat, and 16 ounces for each of the rear floormats.

While the embodiment 10 described above provides a higher static coefficient of friction and dynamic coefficient of friction as well as a greater slip resistance than many multilayer non-slip carpeting materials presently being utilized, in some applications, of course, it is desired that even more positive retention of the multilayer floormat is desired. Such applications, of course, include vehicles where there can be a safety consideration associated with relative movement between the floormat and such operational controls as the accelerator or the brake.

Figure 3:
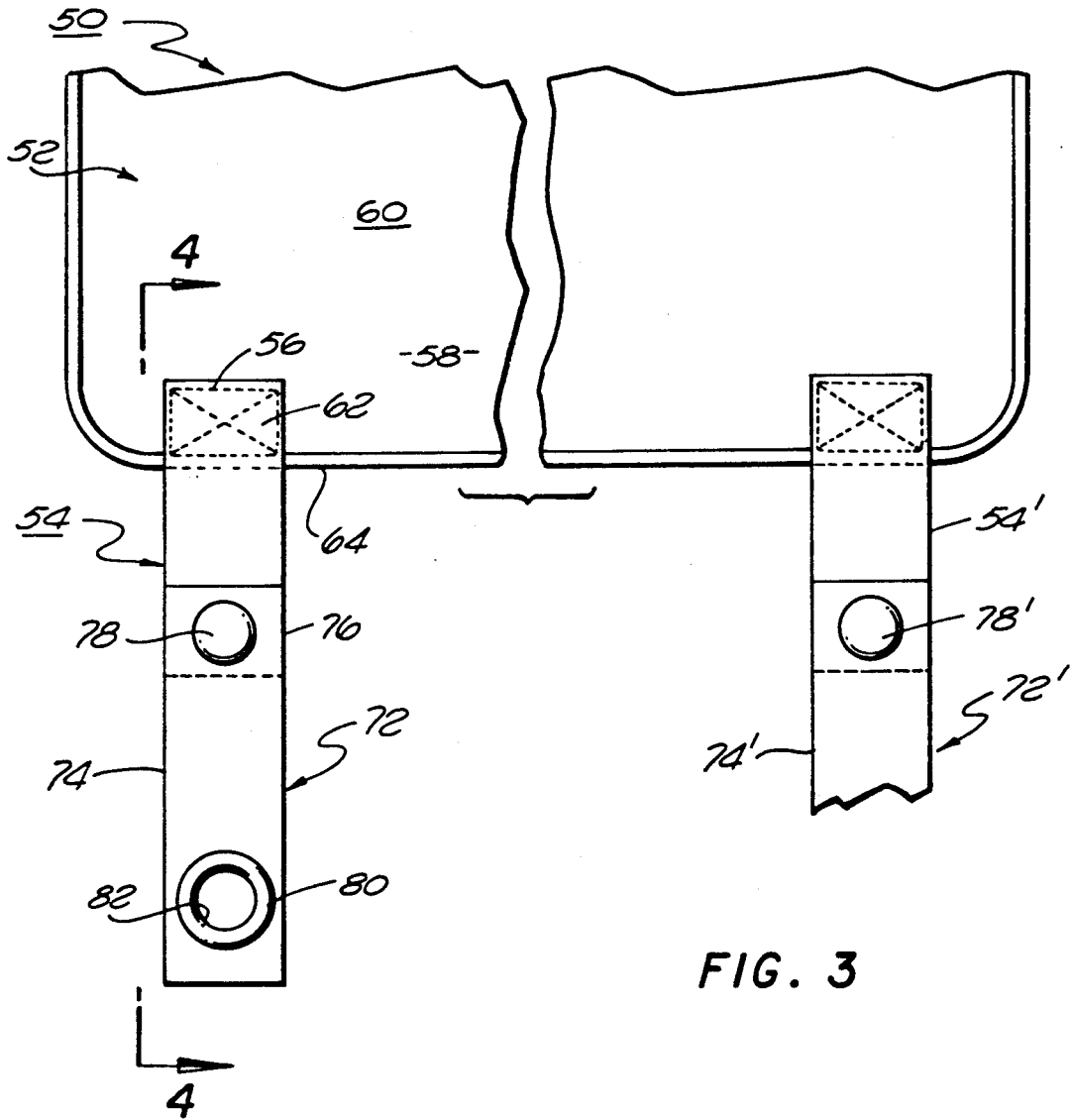
FIG. 3 illustrates another embodiment of the present invention.

FIG. 3 illustrates an embodiment generally designated 50 of a floormat generally designated 52 according to the principles of the present invention which can provide positive retention of the floormat 52. The multilayer floormat 52 is generally fabricated the same as the multilayer floormat 12 described above. However, on the multilayer floormat 52 there is provided a flexible primary strap means generally designated 54 which may be secured, for example by sewing as indicated at 56 to the lower surface 58 of the third layer 60 of the multilayer floormat 52. The third layer 60 may be substantially identical to the third layer 26 described above. The flexible primary straps means 54 has a first portion generally designated at 62 that is secured to the multilayer floormat 52 in regions adjacent the peripheral edge 64 thereof.

Figure 4:
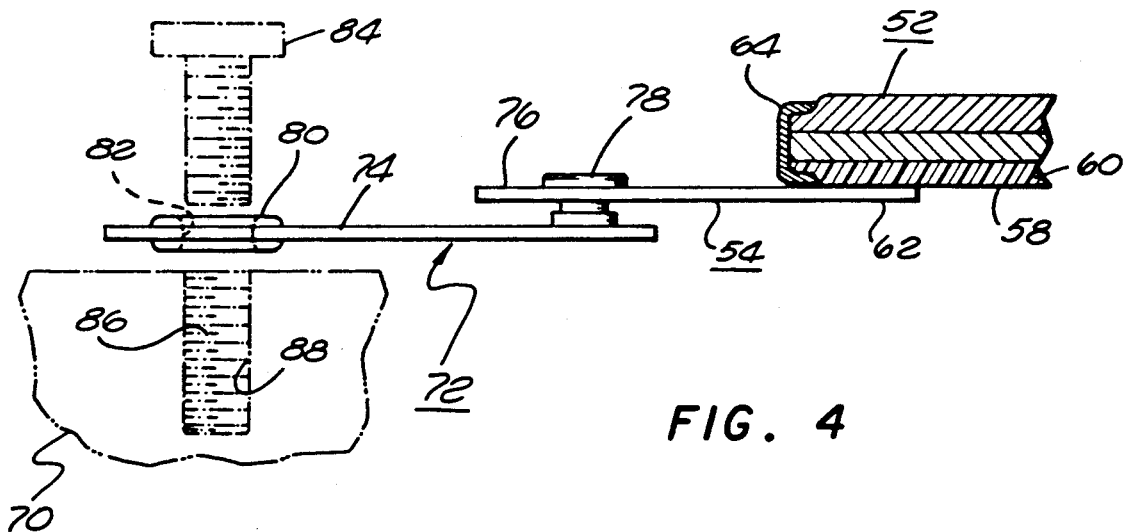
FIG. 4 is a view along the line 4—4 of FIG. 3.

In order to secure the multilayer floormat at 52 to, for example, the vehicle, as shown in FIG. 4, a portion of the structure of the vehicle is indicated generally at 70 in phantom lines. Therefore, attachment means generally designated 72 are provided for securing the multilayer floormat 52 to the vehicle 70. Such attachment means 72 generally comprise a secondary flexible strap means 74 that, preferably, is detachably coupled to a second end portion 76 of the first resilient strap means 54 by, for example, a conventional snap fastener generally designated at 78. A grommet 80 is provided in the secondary flexible strap means 74 and has an annular opening as indicated at 82 which extends through the secondary flexible strap means 74. A bolt indicated generally at 84 in phantom lines may be positioned through the annular opening 82 and threadingly engage threads 86 defining an aperture 88 in the vehicle structure 70.

If desired more than one flexible primary strap means and flexible secondary strap means may be included on the multilayer floormat 52. As shown in FIG. 3, for example, there may be provided a second flexible primary strap means 54' substantially identical to the first flexible primary strap means 54 and a second attachment means 72' having a second flexible secondary attachment means 74' coupled together by a detachable snap fastener 78'. The method of attachment of the second secondary strap means 74' to the vehicle 70 may be the same as shown for the first flexible secondary strap means 74 or different attachment means may be utilized as desired.

Further, while the preferred embodiment 50 described above utilizes the detachable coupling of the snap fasteners 78 which allow convenient removal of the multilayer floormat 52 without, for example, detaching the bolt 84 so that the multilayer floormat 52 may be cleaned or if desired, replaced, in some applications it may be desired to provide an attachment without a detachable coupling.

FIG. 5 illustrates an embodiment generally designated 90 in which there is provided a multilayer floormat 92 which is substantially identical to the multilayer floormat 52 described above in connection with FIGS. 3 and 4. A flexible primary strap means generally designated 94 is provided and is sewn as indicated at 96 to, for example, the lower surface 98 of the non-slip layer 100 of the multilayer floormat means 92. The non-slip layer 100 may, for example, be identical to the non-slip layer 26 described above in connection with FIGS. 1 and 2 and the layer 60 as described above in connection with FIGS. 3 and 4. However, the flexible primary strap means 94 is provided with an annular grommet 80' having walls 81 defining the annular aperture 82' through which, for example, a bolt (not shown in FIG. 5) of the type shown in FIG. 4 for attachment to a vehicle 70 (not shown in FIG. 5) as indicated in FIG. 4. In order to remove the multilayer floormat 92 from such an installation in the vehicle, it is necessary to remove the bolt 84 securing the multilayer floormat 92 to the vehicle 70.

In preferred embodiments of the present invention where the flexible primary strap means are utilized for example on the multilayer floormat positioned on the driver's side of the vehicle, the portion 64' of the peripheral edge 64 of the multilayer floormat 92 and 52 is generally the rear peripheral portion thereof. Such positioning eliminates the movement of the multilayer floormat 52 or 92 towards the accelerator pedal or brake pedal and thus prevents interference therewith. The flexible primary strap means 54, 54' and 94 and the flexible secondary strap means 74 and 74' may be fabricated, for example, from nylon.

In other applications of the present invention it may be desired to use an attachment means to a floormat in a vehicle wherein the floormat is fabricated from any desired material or combination of materials. FIG. 6 illustrates an embodiment generally designated 100 in which a floormat generally indicated at 102 is provided for installation in a motor vehicle. The floormat 102 may be provided with a flexible strap means as indicated at 104 which, for example, may include the flexible primary strap means 106 and the flexible secondary strap means 108 having a grommet 80'' therein. The flexible primary strap means 104 and flexible secondary strap means 108 may be the same as indicated for the flexible primary strap means 54 and flexible secondary strap means 74 in FIG. 3. Alternatively, the flexible primary strap means 104 may be the same as the flexible primary strap means 94 shown in FIG. 5. The flexible primary strap means 104 may be secured, for example, by stitching as indicated at 110 to the floormat 102.

It will be appreciated that the lower surface of the non-slip layer of multilayer floormat 12, 52 or 92 is the surface that is placed adjacent to the surface on which the floormat rests in order that the non-slip characteristics thereof can prevent relative movement therebetween.

It has been found that the thickness of the third or non-slip layer 26, 60 or 100, for example, may be on the order of ⅛th of an inch to 5/16ths of an inch though greater thicknesses may be utilized if desired for particular applications.

The present invention also has applicability to the floormats which may be utilized in applications other than in vehicles. For example, in such applications as bathrooms, kitchens, parquet floors, other wood floors or any other type of flooring where the rug is not permanently affixed to such flooring. FIG. 7 illustrates an embodiment generally designated 110 of a multilayer floormat generally designated 112. The multilayer floormat 112 is fabricated from, for example, the same type of materials as the floormat 12 as shown in FIGS. 1 and 2. Thus there is a first outer layer 114 generally similar to the first outer layer 14 and providing the carpeting layer, an intermediate layer generally designated 116 similar to the intermediate layer 22 and a lower layer 118 bonded to the intermediate layer 116 by layer of bonding material 120. The lower layer 118 may be similar to the layer 26 described above, the bonding material 120 may be the same as the bonding material 34 described above. Such a multilayer non-slip floormat 112 may, therefore, have a peripheral edge 122 defining any desired geometrical shape such as oval, rectangular, square or the like. The peripheral edge 122 has an edge binding material 124 generally similar to the edge binding material 36 shown in FIGS. 1 and 2.

This concludes the description of the present invention. Those skilled in the art may find many variations and adaptations thereof and all such variations and adaptations falling within the true scope and spirit of the impended claims are intended to be governed thereby.

What is claimed is:

1. A nonslip floormat comprising, in combination: a multilayer mat means having:
   a first upper layer comprising a carpet layer having an outer surface, and inner surface and a peripheral edge defining a predetermined geometrical shape;
   a second intermediate layer comprising a carpet backing material layer extending substantially coextensive with said first layer and having a peripheral edge aligned with said peripheral edge of said first layer, and said second layer bonded to said inner surface of said first layer substantially throughout the extent thereof;
   a third lower layer having an inner surface and a lower surface and a predetermined thickness therebetween comprising a nonslip layer and extending substantially coextensive with said second layer and having a peripheral edge aligned with said peripheral edges of said first layer and said second layer, and said third layer fabricated from ethylene-propylene-terpolymer-polyethelene-butyl and comprising a closed cell expanded material having a density of approximately 5 pounds per cubic foot, a shore durometer hardness on the 00 scale in the range of 20 to 45, and a compression deflection in the range of b 2 to 5 pounds per square inch; and
   bonding means between said second layer and said third layer for bonding said inner surface of said third layer to said second layer.

2. The arrangement defined in claim 1 wherein:
   said predetermined thickness of said third layer is in the range of ⅛th inch to 5/16ths inch.

3. The arrangement defined in claim 2 and further comprising:
   edge binding means extending around said peripheral edges of said first, second and third layers and having a first portion extending over said outer surface of said first layer in regions adjacent said peripheral edge thereof, and a second portion extending over said lower surface of said third layer in regions adjacent said peripheral edge thereof; and
   securing means for securing said edge binding means to said first, second and third layers; and
   wherein said securing means further comprises:
      carpet sewing thread means extending through said first portion of said edge binding means, said first layer, said second layer, said third layer and said second portion of said edge binding means substantially continuously around said peripheral edge of said first, said second and said third layers.

4. The arrangement defined in claim 1 wherein:
   said predetermined thickness of said third layer is on the order of ⅛th inch.

5. The arrangement defined in claim 4 and further comprising:
   edge binding means extending around said peripheral edges of said first, second and third layers and having a first portion extending over said outer surface of said first layer in regions adjacent said peripheral edge thereof, and a second portion extending over said lower surface of said third layer in regions adjacent said peripheral edge thereof; and
   securing means for securing said edge binding means to said first, second and third layers; and
   wherein said securing means further comprises:
      carpet sewing thread means extending through said first portion of said edge binding means, said first layer, said second layer, said third layer and said second portion of said edge binding means substantially continuously around said peripheral edge of said first, said second and said third layers.

6. The arrangement defined in claim 1 and further comprising:
   edge binding means extending around said peripheral edges of said first, second and third layers and having a first portion extending over said outer surface of said first layer in regions adjacent said peripheral edge thereof, and a second portion extending over said lower surface of said third layer in regions adjacent said peripheral edge thereof; and
   securing means for securing said edge binding means to said first, second and third layers.

7. The arrangement defined in claim 6 wherein:
   said securing means further comprises:
      carpet sewing thread means extending through said first portion of said edge binding means, said first layer, said second layer, said third layer and said second portion of said edge binding means substantially continuously around said peripheral edge of said first, said second and said third layers.

8. The arrangement defined in claim 1 wherein:
   said predetermined thickness of said third layer is on the order of ⅛th inch;
   and further comprising:
      edge binding means extending around said peripheral edges of said first, second and third layers and having a first portion extending over said outer surface of said first layer in regions adjacent said peripheral edge thereof, and a second portion extending over said lower surface of said third layer in regions adjacent said peripheral edge thereof; and
      securing means for securing said edge binding means to said first, second and third layers.

9. The arrangement defined in claim 1 wherein:
   said predetermined thickness of said third layer is in the range of ⅛th inch to 5/16ths inch;
   and further comprising:
      edge binding means extending around said peripheral edges of said first, second and third layers and having a first portion extending over said outer surface of said first layer in regions adjacent said peripheral edge thereof, and a second portion extending over said lower surface of said third layer in regions adjacent said peripheral edge thereof; and
      securing means for securing said edge binding means to said first, second and third layers.

10. A nonslip multilayer floormat having a lower layer positionable on the carpeting of a vehicle, and the vehicle has an anchor structure for attachment of the vehicle to the multilayer floormat and comprising, in combination:
    a multilayer floormat means having:
       a first upper layer comprising a carpet layer having an outer surface, an inner surface and a peripheral edge defining a predetermined geometrical shape;
       a second intermediate layer comprising a carpet backing material layer extending substantially coextensive with said first layer and having a peripheral edge aligned with said peripheral edge of sad first layer, and said second layer bonded to said inner surface of said first layer substantially throughout the extend thereof;

a third lower layer having an inner surface and a lower surface and a predetermined thickness therebetween comprising a nonslip layer and extending substantially coextensive with said second layer and having a peripheral edge aligned with said peripheral edges of said first layer and said second layer, and said third layer fabricated from ethylene-propylene-terpolymer-polyethelene-butyl and comprising a closed-cell expanded material having a density of approximately 5 pounds per cubic foot, a shore durometer hardness on the 00 scale in the range of 20 to 45, and a compression deflection in the range of 2 to 5 pounds per square inch; and bonding means between said second layer and said third layer for bonding said inner surface of said third layer to said second layer;

flexible primary strap means having a first end portion secured to said multilayer floormat in regions adjacent a predetermined location of the peripheral edge thereof, and a second end portion remote from said first end portion and extending a preselected distance from said peripheral edge of said multilayer floormat to regions external thereof; and attachment means for attaching said second end portion of said flexible primary strap means to the anchoring structure of the vehicle for attaching said multilayer floormat to the vehicle.

11. The arrangement defined in claim 10 wherein:
said attachment means further comprises:
a flexible secondary strap means;
annular grommet means extending through said flexible secondary strap means and having walls defining an aperture therethrough;
coupling means for coupling said flexible secondary strap means to said flexible primary strap means; and
said flexible primary strap means is secured to said multilayer floormat means on said lower surface of said third layer.

12. The arrangement defined in claim 11 wherein:
said coupling means for coupling said flexible secondary strap means to said flexible primary strap means is a detachable coupling means.

13. The arrangement defined in claim 10 wherein:
said predetermined thickness of said third layer is in the range of ⅛th inch to 5/16ths inch.

14. The arrangement defined in claim 10 wherein:
said predetermined thickness of said third layer is on the order of ⅛th inch;
edge binding means extending around said peripheral edges of said first, second and third layers and having a first portion extending over said outer surface of said first layer in regions adjacent said peripheral edge thereof, and a second portion extending over said lower surface of said third layer in regions adjacent said peripheral edge thereof;
securing means for securing said edge binding means to said first, second and third layers; and
said securing means further comprises:
carpet sewing thread means extending through said first portion of said edge binding means, said first layer, said second layer, said third layer and said second portion of said edge binding means substantially continuously around said peripheral edge of said first, said second and said third layers.

* * * * *